United States Patent [19]

Doyle et al.

[11] 4,444,822

[45] Apr. 24, 1984

[54] SAILCLOTH

[75] Inventors: Brian P. Doyle, Natick; John C. Sparkman, Charlestown, both of Mass.

[73] Assignee: Howe & Bainbridge, Boston, Mass.

[21] Appl. No.: 477,154

[22] Filed: Mar. 21, 1983

[51] Int. Cl.³ .............................................. B32B 5/12
[52] U.S. Cl. .................................. 428/109; 428/105; 428/110; 428/253; 428/254; 428/257; 428/297; 428/334
[58] Field of Search ............... 428/253, 254, 257, 102, 428/105, 109, 110, 343, 354

[56] References Cited

U.S. PATENT DOCUMENTS 4,301,204  11/1981  McCusker et al. ................. 428/257
4,304,813  12/1981  Elmore ............................... 428/254

Primary Examiner—James J. Bell
Attorney, Agent, or Firm—Robert T. Gammons

[57] ABSTRACT

A sailcloth comprising a laminate of a continuous sheet of synthetic resin bonded to an unwoven, warp knit scrim and, optionally, coated on the exposed side of the warp knit scrim with a synthetic resin.

17 Claims, 3 Drawing Figures

SAILCLOTH

BACKGROUND OF INVENTION

Conventional woven sailcloth, whether natural or man-made fibers, is prone to stretch due to the sinuosity of the warp yarns. This is highly undesirable to the meticulous sailor. It is the purpose of this invention to provide a sailcloth substitute which is highly resistant to stretching.

SUMMARY OF INVENTION

As herein illustrated, the sailcloth of this invention comprises in one form a laminate of a continuous film of synthetic resin and an unwoven knit reinforcing scrim bonded face-to-face wherein the scrim is a system of spaced, parallel strands laid up in layers with the strands in one layer crossing those in the other layer and with a continuous knitting strand binding the unwoven strands of the two layers at their crossings together. An adhesive of synthetic resin is employed to bond the film and scrim to each other. The adhesive is desirably comprised of a cross-linked polyester thermoset. Optionally, there is an adhesive layer of synthetic resin applied to the exposed side of the scrim. The continuous film, although not necessarily homogeneous, is desirably an oriented polyester such as Mylar. The strands of the scrim are desirably laid up at right angles to each other; however, it is within the scope of the invention to dispose them at other than right angles and, preferably, the strands are comprised of synthetic fibers such as filaments of nylon, polyester and Aramids such as Kevlar. It is within the scope of the invention to combine two or more films and/or scrims.

The invention will now be described in greater detail with reference to the accompanying drawings, wherein.

Figure 1:
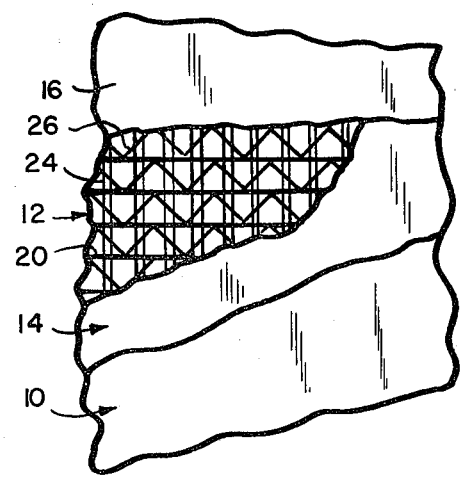
FIG. 1 is a plan view of a portion of sailcloth made according to this invention with the several layers of which it is composed broken away to illustrate the layers.
Figure 2:
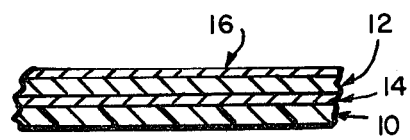
FIG. 2 is an enlarged section taken on the line 2—2 of FIG. 2.
Figure 3:
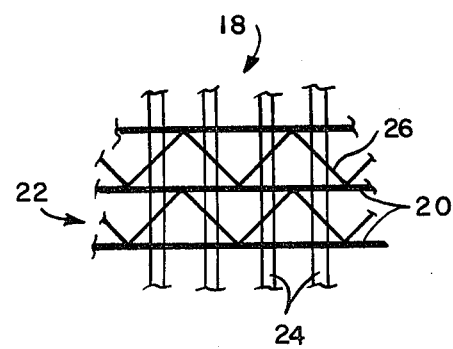
FIG. 3 is a plan view of a portion of the warp knit scrim.

Referring to the drawings, the sailcloth made according to this invention is comprised in one form of a laminate of two plies, a continuous film of synthetic resin 10 and a dimensionally stable, non-woven knit reinforcement scrim 12 bonded to the film by an adhesive layer 14 of synthetic resin and, optionally, provided with a facing layer of synthetic resin 16 applied to the exposed side of the scrim. A portion of sailcloth made according to this form of the invention is shown in FIGS. 1 and 2 wherein there is a single ply of synthetic resin film 10 and a single ply of scrim 12. However, it is within the scope of the invention to laminate two or more of the films 10 and scrims 12.

The synthetic resin film 10 is desirably a continuous sheet of synthetic resin ¼ to 5 mils in thickness which, although not necessarily homogeneous, is desirably a drawn oriented polyester film such as Mylar which has a very high tensile modulus. Other synthetics can be used such as nylon, polypropylene and the like.

The reinforcement scrim 12 is a concatenated system of synthetic resin strands wherein there is, in its simplest form, a layer 18 of spaced, parallel weft strands 20 laid up on a layer 22 of spaced, parallel warp strands 24 with the strands in the two layers crossing and joined by a tying strand 26 which not only joins the layers but anchors the strands at a predetermined spacing. The tying strand 26 is knitted. Such a structure is inherently inextensible except by stretching of the yarns themselves in tension since the strands of which it is composed contains no deviations, that is, sinuosities, as is characteristic of a woven structure. While the strands in the respective layers are shown as disposed at right angles to each other, it is to be understood that they may be positiond at other angles than at right angles. The scrim as described is manufactured on a Liba machine and is commonly referred to as a knit scrim, a fabric which is unwoven and which has a high degree of open space between strands.

The warp, weft and knit strands of the reinforcing scrim 12 are desirably comprised of synthetic fibers in the form of multiple fibers or monofilaments without twist, for example, nylon, polyesters or Aramids such as Kevlar. The warp and weft strands are from 70 to 1000 denier and the knit strand 20 to 200 denier. Desirably, there are 4 to 40 strands per inch of each of the warp and weft strands and 4 to 40 loops per inch in the knit strand.

The synthetic resin layer employed is an adhesive for bonding the plies to each other and for fixing the scrim is desirably a solvent-based synthetic resin, for example, a cross-linked polyester thermoset.

Five specific examples of sailcloth made according to the invention are set forth below wherein the several examples are identified as 16P440, 10P1000, 16P1000, 7K1000, 16K1000.

EXAMPLE 16P440

The film is Dupont Mylar type A of 1 mil thickness; the warp strands of the scrim are of polyester type 777 Celanese Fortrel, 10 warps to the inch, 250 denier and zero twist; the weft strands of the scrim are of Dupont Dacron type 52, 16 wefts to the inch, of a denier of 440 and zero twist; and the knit strand is a polyester type D211 Celanese Fortrel, 16 loops per inch, 70 denier and zero twist.

EXAMPLE 10P1000

The film is Dupont Mylar type A of a thickness of 1.5 mils; the warp strands of the scrim are polyester type 777 Celanese Fortrel of 250 denier, zero twist and 10 to the inch; the weft of the scrim is Celanese Fortrel type 787, 1000 denier, zero twist and 10 to the inch; and the knit strand is a polyester type D, 211 Celanese Fortrel of 70 denier, zero twist and 10 loops per inch.

EXAMPLE 16P1000

The film is a Dupont Mylar type A of 2 mils thickness; the warp strands of the scrim are of polyester type 777 Celanese Fortrel of 250 denier, zero twist and 10 warps per inch; the weft strands are of Celanese Fortrel type 787 of 1000 denier; zero twist and 16 to the inch; and the knit strand is polyester type D211 Celanese Fortrel of 70 denier, zero twist and 16 loops per inch.

EXAMPLE 7K1000

The film is Dupont Mylar type A of 2 mils thickness; the warp of the scrim is polyester type 777 Celanese Fortrel of 250 denier, zero twist and 10 to the inch; the weft of the scrim is Dupont Kevlar type 29 of 1000 denier, zero twist and 7 to the inch; and the knit strand is polyester type D211 Celanese Fortrel of 70 denier, zero twist and 7 loops to the inch.

EXAMPLE 16K1000

The film is Dupont Mylar type A of 3 mils thickness; the warp of the scrim is polyester type 777 Celanese Fortrel of 250 denier, zero twist and 10 warps to the inch; the weft of the scrim is Dupont Kevlar type 29 of 1000 denier; zero twist and 16 to the inch; and the knit strand is polyester type D111 Celanese Fortrel of 70 denier, zero twist and 16 loops per inch.

The specific examples given above represent commercial sailcloth that is available for the manufacture of sails. However, it is to be understood that these specific examples are not intended to be limiting, but are merely representative of a product line developed by applicant for sailboats of various size and kind.

The sailcloth as thus constructed is translucent and, to a large degree, affords visibility because of the fact that the continuous film is transparent and the synthetic resin employed to effect bonding and coating the exposed surface of the scrim is substantially transparent. Only the yarns of the scrim are opaque and there are sufficient open spaces between yarns to permit ready passage of light and to afford visibility.

As previously mentioned, a facing layer 16 of synthetic resin is desirably applied to the exposed surface of the reinforcing scrim to inhibit fraying of the knit strand, for example, a synthetic resin corresponding to that used to bond the scrim to the film.

The sailcloth is made by coating the adhesive layer 14 onto the surface of the film, moving the coated film through an oven to dry the adhesive, applying the scrim to the coated side of the film and moving the scrim and film together between the nip of a pair of driven, heated, pressure-applying rolls to effect bonding, whereupon the laminate is stored by winding on a beam in the conventional manner. When a facing layer is used, it may be applied by coating after the scrim is bonded to the film in a second pass through the coating macinery. Optionally, the facing layer can be applied simultaneously with the marrying of the scrim to the film in the first pass.

Thus constructed, the sailcloth is not a film of synthetic resin impregnated with fibers or yarns, nor is it a film of synthetic resin into which fibers or yarns have been integrated to the extent that the fibers or yarns are embedded into the surface of the film, but, in contrast, is characterized in that it is comprised of two discrete plies, to wit; a continuous, dimensionally stable film or sheet of synthetic resin and a reinforcing system of two or more layers of spaced, parallel, unwoven strands wherein the strands in one layer cross the layer and are tied at their crossings by a knit strand, the two plies being bonded to each other by means of a layer of synthetic resin and, optionally, a facing coating of synthetic resin on the exposed side of the reinforced system.

It should be understood that the present disclosure is for the purpose of illustration only and includes all modifications or improvements which fall within the scope of the appended claims.

What is claimed is:

1. A sailcloth comprising at least two coextensive plies of flexible material united face-to-face throughout their entire interfaces by a layer of synthetic resin, wherein one ply comprises a system of two layers of spaced, parallel strands wherein the strands in one layer cross the strands in the other layer and wherein the strands in each layer are undeviating and unidirectional and a knit strand tying the crossing strands in the two layers to each other and wherein the other ply is a continuous film of dimensionally stable synthetic resin.

2. A sailcloth according to claim 1 wherein the strands are monofilaments.

3. A sailcloth according to claim 1 wherein the strands are multifilaments.

4. A sailcloth according to claim 1 wherein the strands in one layer are warp strands and those in the other layer are weft strands and wherein the strands range in size from 70 to 1000 denier.

5. A sailcloth according to claim 2 wherein the knit strand is of a denier of from 20 to 200.

6. A sailcloth according to claim 1 wherein the film is an oriented, continuous film having a range of from $\frac{1}{4}$ to 5 mils in thickness.

7. A sailcloth according to claim 1 wherein the one layer is a scrim comprises warp and weft strands 4 to 40 strands per inch and the knit strand is 4 to 40 loops per inch.

8. A sailcloth according to claim 1 wherein the synthetic resin ply is a solvent-based synthetic resin.

9. A sailcloth according to claim 1 wherein the synthetic resin ply is a cross-linked polyester thermoset.

10. A sailcloth according to claim 1 wherein a layer of synthetic resin is applied to the entire exposed surface of the one ply.

11. A sailcloth according to claim 1 wherein the continuous film is Mylar of 1 mil thickness and said one ply comprises a system of warp and weft strands and a knit strand wherein the warp strands are 250 denier, the weft 440 denier and the knit strand 70 denier, wherein the twist in said strands is zero and wherein there are 10 warps to the inch, 16 wefts to the inch and 16 loops to the inch.

12. A sailcloth according to claim 1 wherein the continuous film is Mylar 1.5 mils in thickness and said one ply comprises a system of warp and weft strands and a knit strand wherein the warp strands are 250 denier, the weft strands 1000 denier and the knit strand 70 denier, wherein the twist in said strands is zero and wherein there are 10 strands to the inch and wherein the knit strand has 10 loops to the inch.

13. A sailcloth according to claim 1 wherein the continuous film is Mylar of 2 mils thickness and said one ply comprises a system of warp and weft strands and a knit strand wherein the warp strands are 250 denier, the weft strands 1000 denier and the knit strand 70 denier, wherein the twist in said strands is zero and wherein there are 10 warps to the inch, 16 wefts to the inch and wherein the knit strand has 16 loops to the inch.

14. A sailcloth according to claim 1 wherein the continuous film is Mylar of 2 mils thickness and said one ply comprises a system of warp and weft strands and a knit strand wherein the warp strands are 250 denier, the weft strands 1000 denier and the knit strand 70 denier. Wherein the twist in said strands is zero and wherein there are 10 warp strands to the inch, 7 weft strands to the inch and wherein the knit strand has 7 loops to the inch.

15. A sailcloth according to claim 1 wherein the continuous film is Mylar of 3 mils thickness and said one ply comprises a system of warp and weft strands and a knit strand wherein the warp strands are 250 denier, the weft strands 1000 denier and the knit strand 70 denier, wherein the twist in said strands is zero and wherein there are 10 warps to the inch, 16 wefts to the inch and wherein the knit strand has 16 loops to the inch.

16. A sailcloth comprising two or more coextensive plies of flexible material united face-to-face throughout their entire interfaces by layers of synthetic resin wherein one ply is a continuous film of dimensionally stable synthetic resin and the other plies, one at each face of a continuous film, each comprise a system of two layers of spaced, parallel strands wherein the strands in one layer cross the strands in the other layer and wherein the strands in each layer are undeviating and unidirectional and a knit strand tying the crossing strands in the parallel layers to each other.

17. A sailcloth comprising two or more coextensive plies of flexible material united face-to-face throughout their entire interfaces by layers of synthetic resin wherein one ply comprises a system of two layers of spaced, parallel strands wherein the strands in one layer cross the strands in the other layer and wherein the strands in each layer are undeviated and unidirectional and wherein there is a knit strand tying the crossing strands in the parallel layer to each other and wherein the other plies each comprise continuous films of dimensionally stable synthetic resin united by means of synthetic resin to the opposite faces of the one ply.

* * * * *